United States Patent Office 3,655,841
Patented Apr. 11, 1972

3,655,841
HEAT TREATING SINTERED MANGANESE-ZINC FERRITES TO IMPROVE PROPERTIES
Tsuneo Akashi, Izuru Sugano, Taneaki Okuda, Yoshihiro Onodo, and Toshiro Tsuji, Tokyo, Japan, assignors to Nippon Electric Company, Limited, Tokyo, Japan
Continuation-in-part of application Ser. No. 762,403, Sept. 25, 1968. This application Oct. 7, 1970, Ser. No. 78,808
Claims priority, application Japan, Sept. 26, 1967, 42/62,961
Int. Cl. C04b 35/26, 35/36, 35/38
U.S. Cl. 264—66                                    6 Claims

ABSTRACT OF THE DISCLOSURE

The properties of manganese-zinc ferrites are improved by subjecting previously sintered ferrites to a low-temperature heat treatment at temperatures ranging up to about 400° C. The actual temperatures used are determined by the iron oxide content of the ferrite.

---

This invention relates to a method for producing manganese-zinc (Mn-Zn) ferrites and, in particular, to a method for improving both the hysteresis loss and the time stability of initial permeability of Mn-Zn ferrite.

This application is a continuation-in-part of application Ser. No. 762,403, filed Sept. 25, 1968 and now abandoned.

Mn-Zn ferrite has wide uses as a magnetic material for communication equipment and has been improved in properties for specific applications. The recent progress achieved in the field of communication has made it an important consideration to miniaturize magnetic cores and improve their performance and stability. This has necessitated the development of materials exhibiting markedly improved quality accompanied by small hysteresis loss and excellent time stability of initial permeability.

In order to improve loss characteristics, it has heretofore been proposed to use one or more addition agents or to control the firing conditions. However, none of these proposals has provided a Mn-Zn ferrite having a hysteresis loss $h_{10}$ at 100 kHz. less than about 15, and, at the same time, exhibit excellent time stability of initial permeability.

In this description of the invention, the term "hysteresis loss $h_{10}$" as used is defined by the equation:

$$\left(\frac{R}{\omega L}\right)_{coil} = \frac{\tan \delta}{\mu} \cdot \mu e + h_{10} \left(\frac{\mu e}{1000}\right) \frac{3}{2} \left(\sqrt{\frac{L}{V}}\right) \cdot I$$

and the term "the time stability of initial permeability" is defined by $$\frac{\mu_{10''} - \mu_{100''}}{\mu^2_{10''}} = \left(\frac{\Delta \mu}{\mu^2}\right)_{10''-100''}$$

where:
R: AC resistance (Ω)
ω: Angular frequency
L: Inductance of coil (H)
tan δ: Loss coefficient of coil
μ: Initial permeability of magnetic core
μe: Effective permeability of magnetic core
V: Effective volume of magnetic core (cc)
I: Measuring current (A)
$\mu_{20''}$: Initial permeability 10 seconds after AC demagnetization
$\mu_{100''}$: Initial permeability 100 seconds after AC demagnetization The present invention provides as an object a method for markedly improving both the hysteresis loss and the time stability of initial permeability of Mn-Zn ferrite.

Other objects will clearly appear from the following disclosure and the accompanying drawings; wherein.

Figure 1:
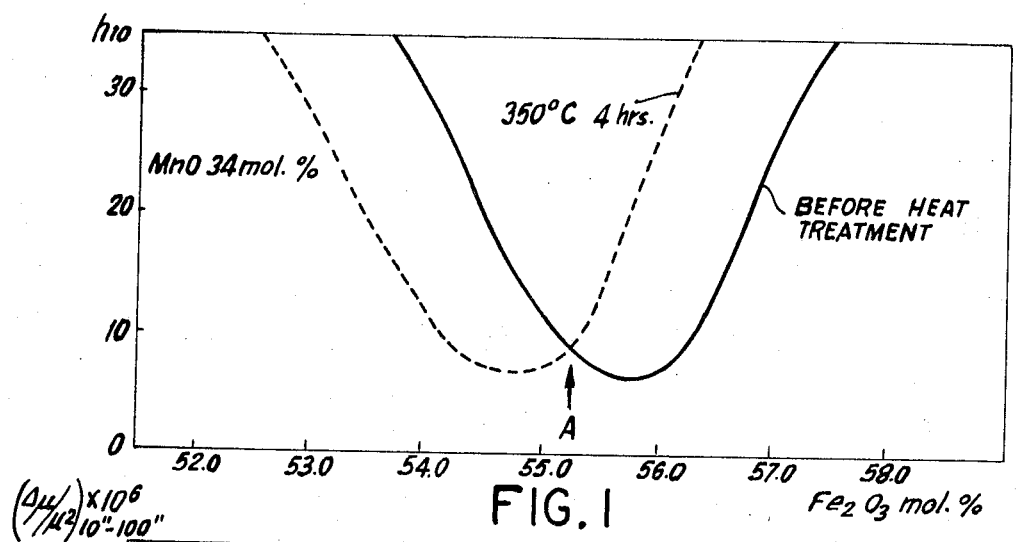
FIGS. 1 to 13 are curves showing the improved characteristics obtained by the method of the invention.

The method of manufacturing Mn-Zn ferrite in accordance with the present invention is characterized by subjecting a sintered Mn-Zn ferrite to a controlled heat treatment at a temperature not higher than about 400° C. and not lower than about 150° C., depending upon the compositions of the ferrite and the sintering conditions employed. The present invention will be apparent from the following fact determined and confirmed through extensive experiments; to wit, that sintered Mn-Zn ferrites may be classified in two groups according to the compositions and the sintering conditions employed. In a first group, the subsequent heat treatment at a temperature of 280° C. to 400° C., for example, at 350° C., remarkably improves the hysteresis loss and the time stability of initial permeability of the ferrites. Mn-Zn ferrites having a relatively small Fe$_2$O$_3$ content belong to this first group. In a second group to which Mn-Zn ferrites having a larger Fe$_2$O$_3$ content belong, the heat treatment at 350° C. considerably deteriorates the above-mentioned magnetic properties. Instead, the magnetic properties are markedly improved by the heat treatment at a temperature of 150° C. to 280° C., for example, at 200° C. The border line dividing the two groups can be represented substantially by a straight line on a composition diagram of the MnO-ZnO-Fe$_2$O$_3$ ternary system. Accordingly, as the oxidizing condition of the ferrites on sintering, which depends on the sintering temperature and atmosphere, becomes strong, the border line shifts toward the composition having a larger Fe$_2$O$_3$ content.

It has also been found that the same effect is obtained by the heat treatment, even when the sintered Mn-Zn ferrites contain one or more or all of the additives CaO, SiO$_2$, SnO$_2$, Li$_2$O and Co$_2$O$_3$ which are effective for improving magnetic properties of the Mn-Zn ferrites. In this case, the border line deviates slightly from the position of the case where the ferrites have no additives.

According to these findings, it is determined readily through the result of the heat treatment at 350° C. to which group a sintered Mn-Zn ferrite belongs. Thus, the improvement of the hysteresis loss and the time stability of initial permeability of the Mn-Zn ferrite can be achieved by heat treatment at a temperature within the range of the determined group. The temperature range is 280° C. to 400° C. for the Mn-Zn ferrites of the first group and 150° C. to 280° C. for those of the second group.

The heat treatment of the invention is evenly effective, regardless of the compositions of the Mn-Zn ferrites and the sintering conditions, provided that the temperature range of the heat treatment is adequately selected. From the point of view of obtaining the ferrite material having a large value of the $\mu.Q$ product and useful in a practical application, it is desirable that the basic composition of the Mn-Zn ferrites lies within the polygonal area A–B–C–D–E of FIG. 15. Moreover, it is preferred for achieving an excellent Mn-Zn ferrite material having a hysteresis loss $h_{10}$ less than 15 by the present invention that the basic composition falls within the area B–F–G–D–E–H–I of FIG. 15. It is again noted that even if the composition of Mn-Zn ferrites does not fall within the above-mentioned area, the hysteresis loss $h_{10}$ can be improved by the present invention; however, the improved value of $h_{10}$ does not fall below 15 because the initial value is generally quite poor. The composition of the points A, B, C, D, E, F, G, H and I are shown in Table 1.

In order to obtain practically useful Mn-Zn ferrites, the sintering conditions employed in the present invention include a sintering temperature ranging from about 1100° C. to 1250° C., a sintering atmosphere of pure $N_2$ or $N_2$ containing 5% or less $O_2$ and a sintering period of 1 to 24 hours which depends on the sintering temperature. In this specification, pure $N_2$ means nitrogen gas containing oxygen gas in a concentration less than 1 p.p.m.

The hysteresis loss and the time stability of initial permeability of the Mn-Zn ferrite thus obtained are both markedly improved over an extensive range of compositions.

These improvements are possibly attributed to the rearrangement of ions or the like in the course of the heat treatment at a low temperature which in turn inhibits the causes for hysteresis loss and the time stability of initial permeabiliy.

It is well known that extreme difficulties are usually encountered in decreasing the hysteresis loss $h_{10}$ at 100 kHz. to less than 15 while, at the same time, markedly improving the time stability of initial permeability when employing conventional firing technique without subsequent heat treatment of the sintered body.

The manufacturing process of the present invention (hereinafter referred to as low-temperature heat treatment) will now be more fully explained. The effects of the heat treatment of sintered materials at relative low temperatures upon the charatceristics of the products are described in Examples 1 and 2, while Examples 3 and 4 are intended to illustrate the range of treatment conditions under which the low-temperature heat treatment can be applied to test specimens produced under certain sintering conditions for effectively improving the hysteresis loss and the time stability of initial permeability of the specimens. These examples thus demonstrate that a low-temperature heat treatment can markedly improve the Mn-Zn ferrite over a wide range of compositions in both the hysteresis loss and the time stability of initial permeability. Example 5 shows the great extent to which the low-temperature heat treatment contributes to the simultaneous improvements in the hysteresis loss and the time stability of initial permeability of the ferrite, regardless of the sintering conditions prior to the treatment. Example 6 is intended to show that the present invention is even effective on Mn-Zn ferrites containing various additives.

Test specimens were prepared by weighing the basic components $Fe_2O_3$, MnO, ZnO and effective amounts of the additives in accordance with predetermined molar ratios, followed by mixing and milling the whole mixture in a ball mill with alcohol used as a dispersion medium, prefiring the mixture at 800° C. for 4 hours in air, press-molding the resultant mixture, and then sintering the pressed compact under the conditions as described in the following examples.

EXAMPLE 1

Figure 2:
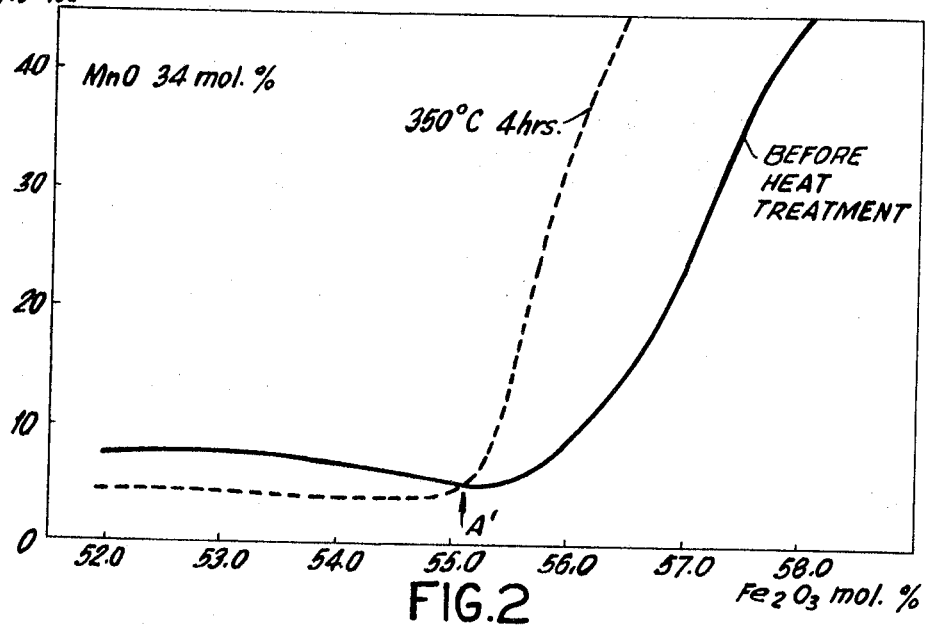

FIGS. 1 and 2 illustrate how the hysteresis loss $h_{10}$ and the time stability of initial permeability $(\Delta\mu/\mu^2)_{10''-100''}$ of test specimens are altered by a low-temperature heat treatment at 350° C. for 4 hours. The specimens which contained MnO=34 mol. percent, $52 \leq Fe_2O_3 \leq 58$ mol. percent and zinc oxide were produced by sintering in $N_2$ containing 0.4% $O_2$ at 1180° C. for 8 hours. It will be seen from these two figures that properties of the compositions in which the $Fe_2O_3$ content is less than A in FIG. 1 or less than A' in FIG. 2 (there being no material difference between the $Fe_2O_3$ contents represented by points A and A') are markedly improved in the hysteresis loss and the time stability of initial permeability. For $Fe_2O_3$ contents in excess of A or A', it will be noted that the properties markedly deteriorate.

Figure 3:
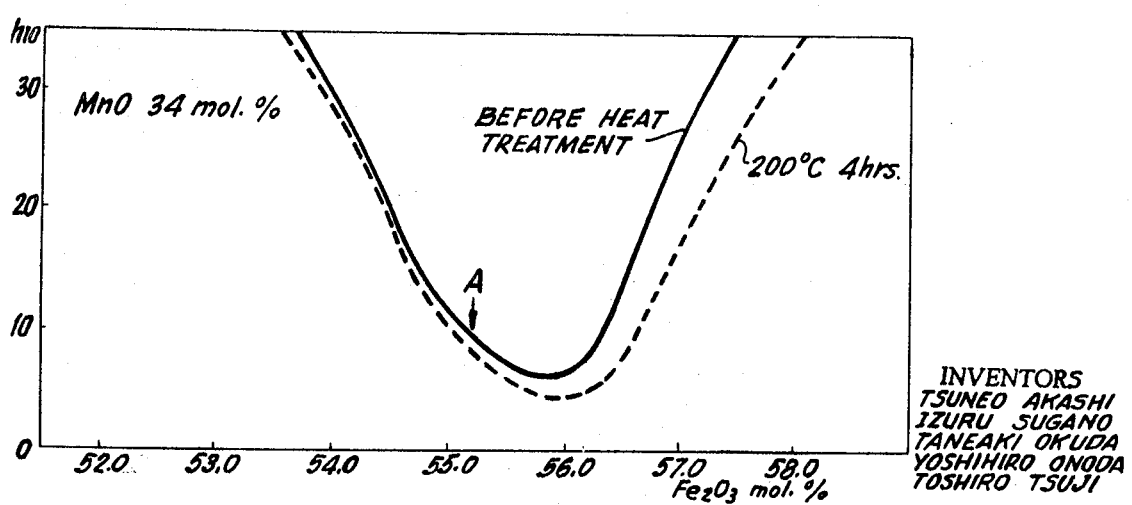
Figure 4:
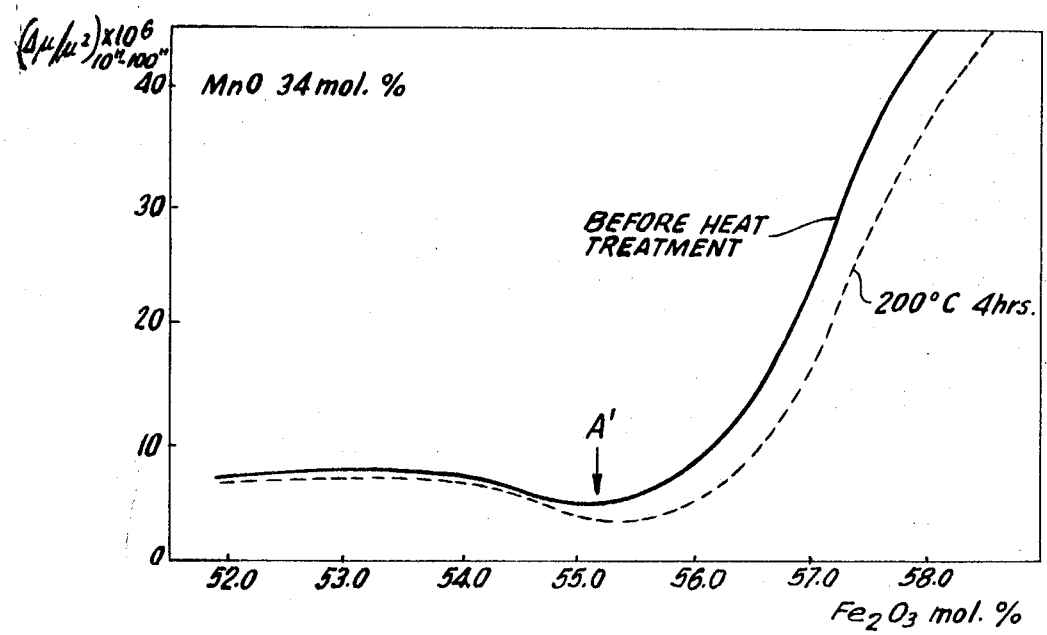

FIGS. 3 and 4 illustrate that the same test specimens as used above are also simultaneously improved in the hysteresis loss and the time stability of initial permeability upon the low-temperature heat treatment, this time at 200° C. for 4 hours. The ameliorative effects in this case are observed throughout the whole range of the experimental compositions, particularly in the compositions having $Fe_2O_3$ contents exceeding A or A'.

EXAMPLE 2

Figure 6:
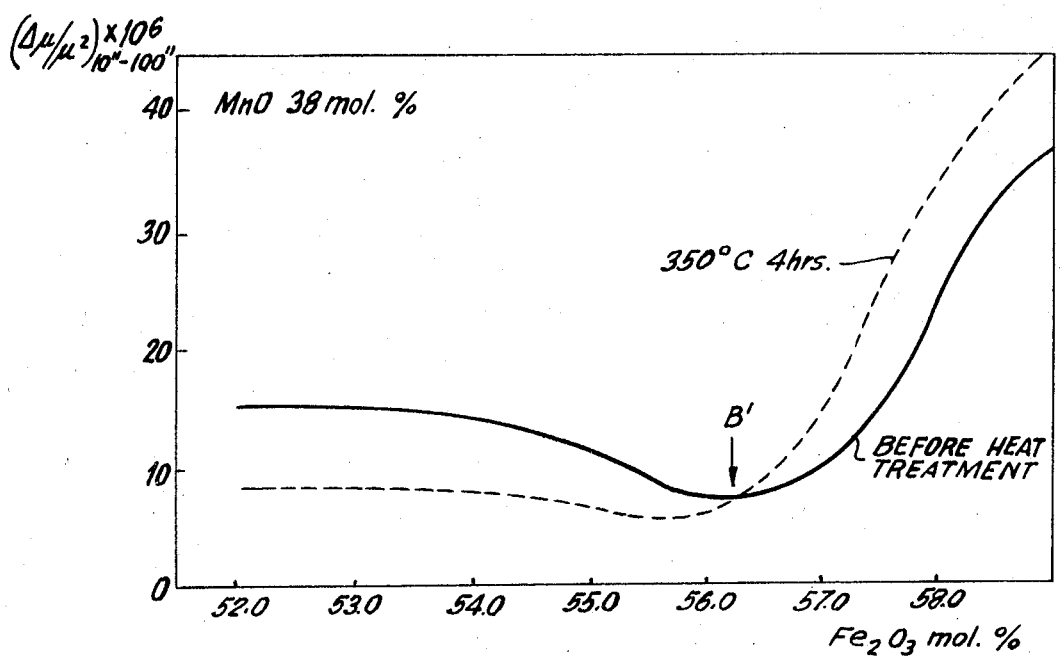
Figure 5:
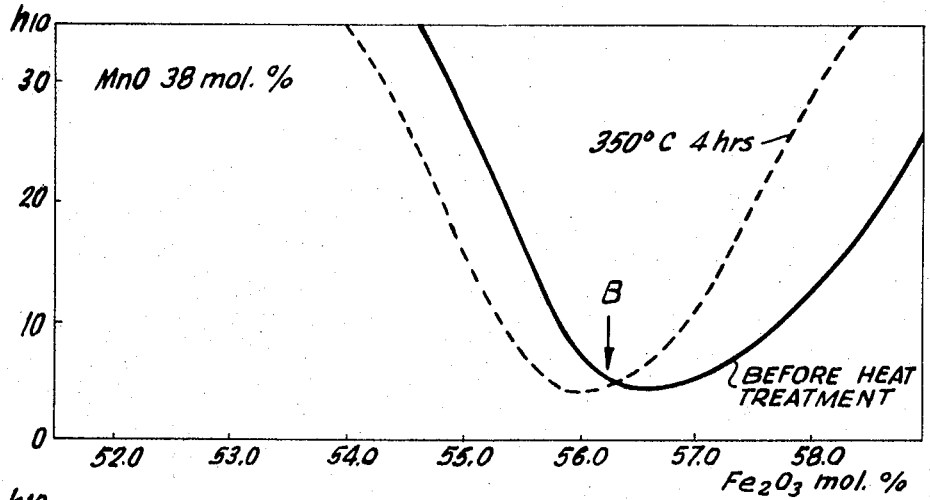
Figure 7:
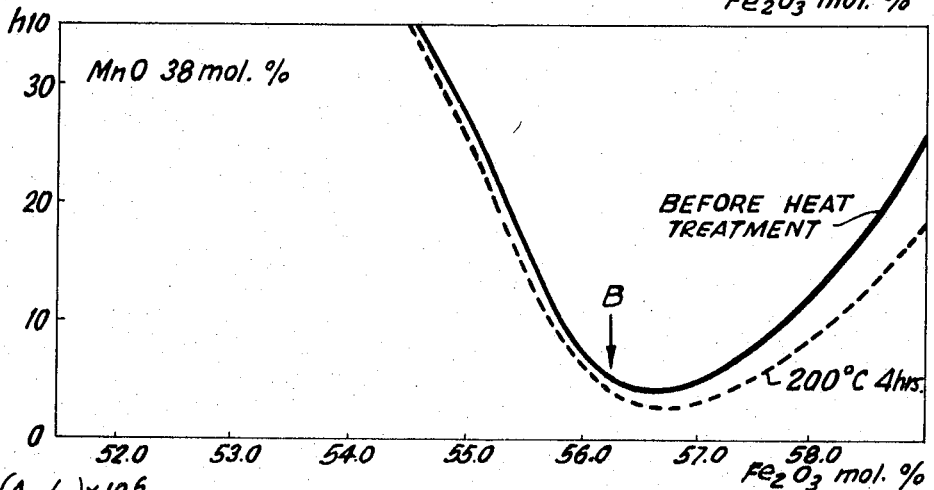
Figure 8:
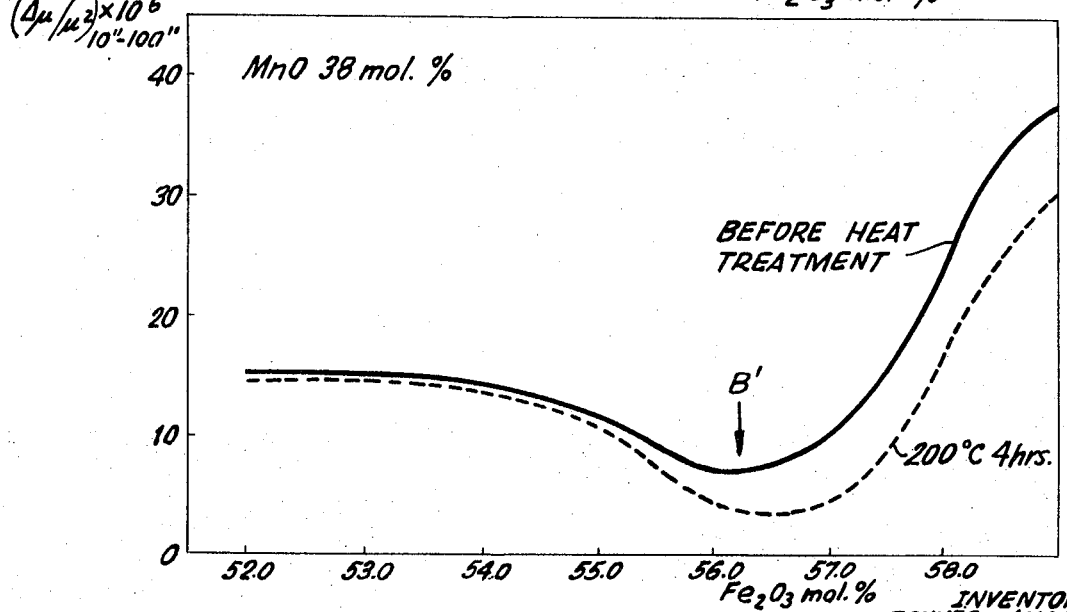

FIGS. 5, 6, 7 and 8 are illustrative of results of experiments carried out in the same way as in Example 1 with Mn-Zn ferrite specimens of the composition MnO-38 mol. percent, $52 \leq Fe_2O_3 \leq 59$ mol. percent and zinc oxide. Upon the heat treatment at 350° C. for 4 hours, as shown in FIGS. 5 and 6, the compositions whose $Fe_2O_3$ contents are below the point B in FIG. 5 or B' in FIG. 6 (the $Fe_2O_3$ contents represented by B and B' being substantially the same) exhibit marked improvements in both hysteresis loss and the time stability of initial permeability. However, with $Fe_2O_3$ contents in excess of B or B', these characteristics are shown to deteriorate. When the treatment is carried out at 200° C. for 4 hours as shown in FIGS. 7 and 8, an improvement is achieved over the whole range of composition. The improvement is particularly noted in $Fe_2O_3$ compositions above the points B or B'.

Thus, it is apparent from Examples 1 and 2 that by treating previously sintered specimens at a suitable low temperature, it is possible to markedly improve Mn-Zn ferrite over a relatively broad range of composition in both the hysteresis loss and the time stability of initial permeability.

In fact, as demonstrated in Example 2, the low-temperature heat treatment according to the present invention results in an excellent Mn-Zn ferrite having a hysteresis loss $h_{10}$ of 3 and the time stability of initial permeability $(\Delta\mu/\mu^2)_{10''-100''}$ of $3 \times 10^{-6}$. As far as it is known, it is believed that such values have not been attained by conventional firing technique.

It has now been demonstrated that the low-temperature heat treatment is effective in improving together the hysteresis loss and the time stability of initial permeability of Mn-Zn ferrite of such compositions as 34 mol. percent or 38 mol. percent of MnO and varying proportions of $Fe_2O_3$ and ZnO. Next the conditions under which the low-temperature heat treatment can be effective over an even more extensive region of Mn-Zn ferrite will be illustrated hereunder.

EXAMPLE 3

Figure 9:
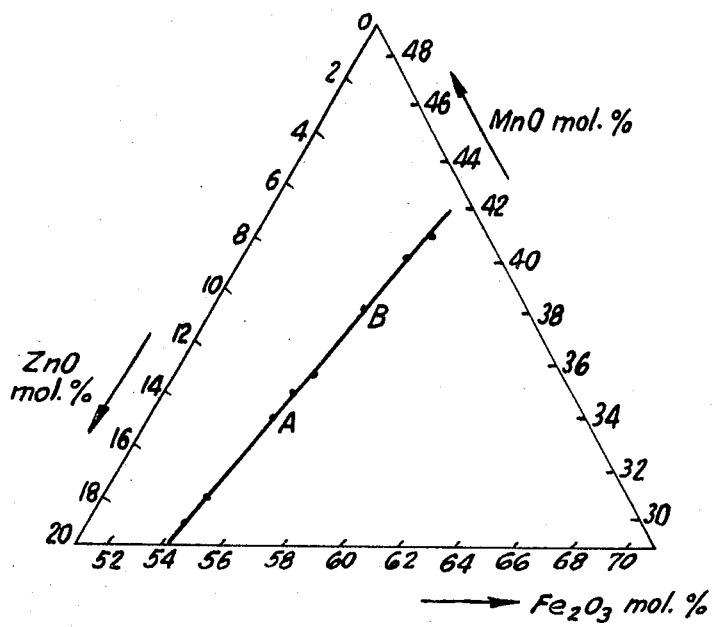

In FIG. 9, there is shown a line containing points A of FIG. 1 and B of FIG. 5 for Mn-Zn ferrite compositions comprising MnO and $Fe_2O_3$ in a relatively broad range of composition, between the region where characteristics are improved and the region where the same tend to deteriorate when test specimens sintered in $N_2$ containing 0.4% $O_2$ at 1180° C. for 8 hours are subjected to heat treatment at 350° C. The line has been drawn as a result of detailed experiments on the compositions of the broader range as above mentioned. As indicated by solid circles lying on the line in the figure, point A in FIG. 1 which corresponds to 34 mol. percent MnO and point B in FIG. 5 which corresponds to 38 mol. percent MnO fall on this line The circles lying on the line are comparable points obtained from a number of experiments carried out using other MnO compositions ranging from just below 30 to just above 42 mol. percent of MnO.

The test specimens of the compositions belonging to the left side region of the border line in FIG. 9 where the $Fe_2O_3$ content is less than that on the border line (hereinafter called the Fe-deficient region) are markedly improved in characteristics by a heat treatment at 350° C., while the specimens of the compositions belonging to the right side region where the $Fe_2O_3$ content is more than that on the border line (hereinafter called the Fe-excessive region) are deteriorated by heat treatment at 350° C. but, on the contrary, are markedly improved in the characteristics by a heat treatment at 200° C.

The effects of low-temperature heat treatment are not only achieved by the treatment at 350° C. or 200° C. for 4 hours, but the treatments at temperatures below 400° C. prove effective as well in improving the characteristics of the materials. This is exemplified by the following.

EXAMPLE 4

Figure 10:
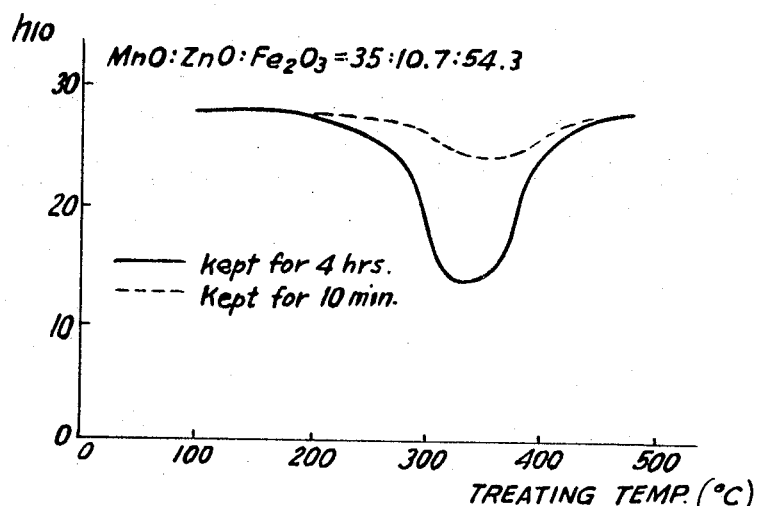
Figure 11:
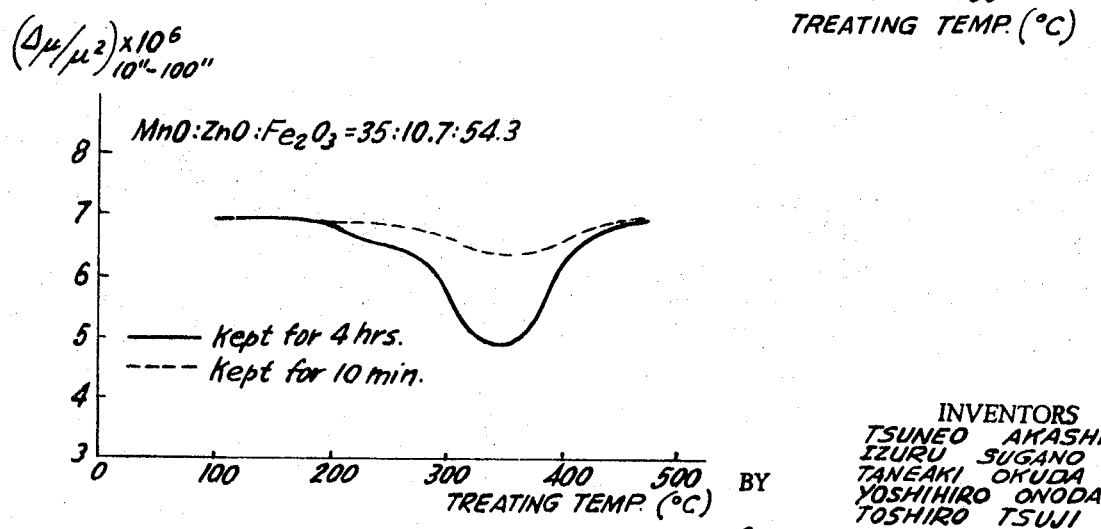

Additional tests using low-temperature heat treatment were conducted, the results of which are shown graphically. FIGS. 10 and 11 are illustrative of test specimens containing 35 mol. percent MnO and having a molar ratio of $MnO:ZnO:Fe_2O_3$ of about 35:10.7:7:54.3. These specimens, which were sintered in $N_2$ containing 0.4% $O_2$ at 1180° C. for 8 hours and fall in the Fe-deficient region, are improved in the hysteresis loss and the time stability of initial permeability by heat treatments at temperatures below 400° C. In the figures, each full line indicates that the specimens were kept at particular temperatures for 4 hours, while the broken line indicates that the specimens were kept at each temperature for only 10 minutes.

Figure 12:
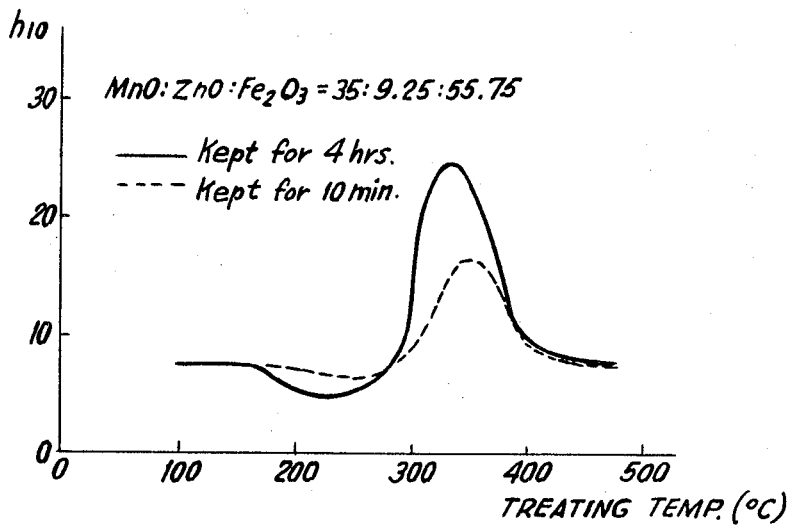
Figure 13:
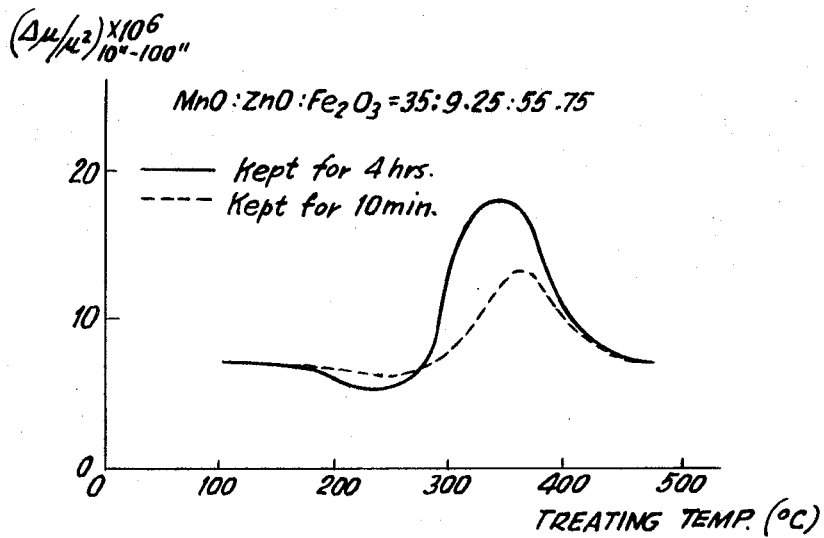

FIGS. 12 and 13 show the results of similar experiments carried out with test specimens also containing 35 mol. percent MnO but having a molar ratio of

of about 35:9.25:55.75, thus falling in the Fe-excessive region.

It is clear from FIGS. 10 and 11 that the test specimens belonging to the Fe-deficient region are remarkably improved in both hysteresis loss and the time stability of initial permeability by the heat treatment at temperatures below 400° C. Also, FIGS. 12 and 13 show that, while the characteristics of test specimens belonging to the Fe-excessive region are extremely deteriorater by a heat treatment at temperatures above approximately 280° C., the heat treatment at temperatures below 280° C. is extremely effective in markedly improving both the hysteresis loss and the time stability of initial permeability of the same compositions.

In the heat treatment, the longer the time duration of the treatment, the greater are the effects thereby achieved as noted from FIGS. 10, 11, 12 and 13. However, the treatment for a period of only 10 minutes proves to be somewhat effective, and thus it is apparent that the specimens of Mn-Zn ferrite kept at temperatures below 400° C. or 280° C. even for limited periods of time can be somewhat improved in the hysteresis loss and the time stability of initial permeability.

Observation of the change in the above-mentioned magnetic properties as a function of the time duration of the treatment has revealed that the rate of the change is great in the earlier part of the time duration and that as the time duration becomes longer, the rate of the change decreases and finally the properties approach, respectively, certain values. On the other hand, the rate of the change becomes greater as the temperature of heat treatment is made higher, as usually occurs in chemical reactions. On the other hand, if the heat treatment is stopped in the earlier part of the time duration thereof where the improvement in properties progresses at a high rate, the resultant values of the properties tend to deviate from desired values. This is inconvenient in commercial practice. In order to avoid this problem, it is important that the time duration of heat treatment exceed at least 1.5 hours, the heat treatment for four hours or more being advantageously preferable.

On the other hand, as the treating temperature decreases, the treating time for improving both hysteresis loss and the time stability of initial permeability becomes longer. Indeed, at temperatures below 150° C., the treating time needed for effectively improving these characteristics of the ferrite is greatly extended. For example, at 150° C., a period for as long as 100 hours results in improvements in both the hysteresis loss and the time stability of initial permeability of at most about 3 percent each. If improvements in excess of 3 percent are to be achieved at a treating temperature below 150° C., such a considerably prolonged period of treatment will be required as to render it commercially unfeasible. It is thus important that the heat treating temperature should not be below 150° C.

It will be appreciated from the foregoing examples that the heat treatment of sintered Mn-Zn ferrite of a relatively broad range of composition of varying MnO and $Fe_2O_3$ contents should be carried out over the range of about 150° C. to 400° C. to insure beneficial improvements in both the hysteresis loss and the time stability of initial permeability.

While no mention has been made in the foregoing examples of the atmosphere during the low-temperature heat treatment, it has been found as the results of experiments that the beneficial effects of the present invention substantially depend upon the treating temperature and time, not upon the treating atmosphere, even if the low-temperature treatments are carried out in an atmosphere from pure $N_2$ (containing $O_2$ in concentration less than 1 p.p.m.) to $O_2$. In general, as is well known to the art the characteristics of Mn-Zn ferrite may be affected by sintering conditions employed.

The low-temperature heat treatment according to the present invention is not only applicable where the sintering before treatment is carried out at 1180° C. for 8 hours in $N_2$ containing 0.4% $O_2$, but is also applicable to all the Mn-Zn ferrite compositions which have been sintered in conformity to conditions usually employed in producing such ferrites. This will be apparent from the following example.

EXAMPLE 5

Figure 14:
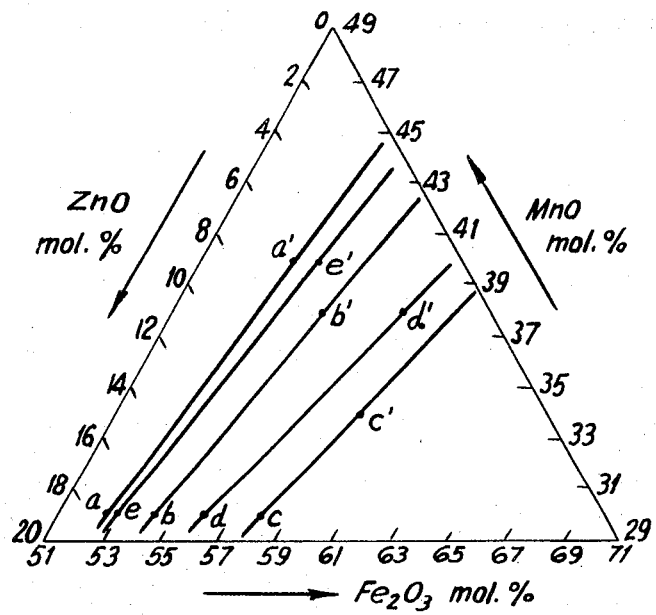
FIGS. 14 and 15 are composition diagrams showing ranges of compositions of Mn-Zn ferrites which are suitable for carrying out the method of the invention.

Test specimens in a broad range of Mn-Zn ferrite compositions were sintered under different conditions, i.e., in pure $N_2$ at 1180° C. for 8 hours, in $N_2$ containing 0.4% $O_2$ at 1180° C. for 8 hours, in $N_2$ containing 0.8% $O_2$ at 1180° C. for 8 hours, in $N_2$ containing 2.5% $O_2$ at 1250° C for 3 hours, and in pure $N_2$ at 1100° C. for 24 hours, the specimens being subsequently subjected to the low-temperature heat treatment. The border lines between the Fe-deficient regions and Fe-excessive regions in the individual cases are indicated in FIG. 14 as: $a-a'$, $b-b'$, $c-c'$, $d-d'$, and $e-e'$.

Specifically, the border line as experimentally determined for the test specimens sintered in $N_2$ at 1180° C. for 8 hours is represented by a straight line which passes through:

$MnO/Fe_2O_3=30/52.7$ (FIG. 14, $a$) containing about 17.3% ZnO $MnO/Fe_2O_3=40/54.3$ (FIG. 14, $a'$) containing about 5.7% of ZnO;

and the border line for the test specimens sintered in $N_2$ containing 0.4% $O_2$ at 1180° C. for 8 hours, as described above in this example, is represented by a straight line that passes through:

$MnO/Fe_2O_3=30/54.3$ (FIG. 14, $b$) containing about 15.7% ZnO $MnO/Fe_2O_3=38/56.3$ (FIG. 14, $b'$) containing about 5.7% ZnO;

and also the border line for the test specimens sintered in $N_2$ containing 0.8% $O_2$ at 1180° C. for 8 hours is represented by a straight line that has been found as the results of experiments to pass through:

$MnO/Fe_2O_3=30/58$ (FIG. 14, $c$) containing about 12% ZnO $MnO/Fe_2O_3=34/59$ (FIG. 14, $c'$) containing about 6.6% ZnO.

The border line as experimentally determined for the test specimens sintered in $N_2$ containing 2.5% $O_2$ at 1250° C. for 3 hours is represented by a straight line passing through:

$MnO/Fe_2O_3=30/56$ (point $d$ in FIG. 14)
$MnO/Fe_2O_3=38/59$ (point $d'$ in FIG. 14)

and the border line for the test specimens sintered in pure $N_2$ at 1100° C. for 24 hours is represented by a straight line that has been found as the result of experiments to pass through:

$MnO/Fe_2O_3=30/53$ (point $e$ in FIG. 14)
$MnO/Fe_2O_3=40/55$ (point $e'$ in FIG. 14).

As explained in Example 4, the treatment at a temperature between 400° C. and 150° C. is effective for the simultaneous improvements of hysteresis loss and the time stability of initial permeability of best specimens of compositions belonging to the Fe-deficient region. On the other hand, for the test specimens of compositions belonging to the Fe-excessive region, the treatment at temperatures in the range of 280° C. to 150° C. proves effective. It has been found by the present example that, while the above phenomena remain unaffected by the variation of conditions for sintering prior to the low-temperature heat treatment, the border line between the Fe-deficient region and the Fe-excessive region may be shifted under certain sintering conditions, that is, the border line is shifted toward the side of the Fe-excessive region as the sintering conditions of the specimens becomes more oxidizing ones. It has also been confirmed that the particular Fe-deficient region or Fe-excessive region to which a given Mn-Zn ferrite belongs can be readily determined by the result of heat treatment at 350° C. for 4 hours and that the effect of the heat treatment carried out on the basis of this determination remains unaffected by the sintering conditions.

Extensive experiments have been conducted in which Mn-Zn ferrites of the following compositions have been subjected to the heat treatment of the invention;

30 mol percent$\leq$MnO$\leq$42 mol percent
0 mol percent$\leq$ZnO$\leq$18 mol percent
52 mol percent$\leq$Fe$_2$O$_3$$\leq$59.4 mol percent which compositions were sintered in $N_2$ containing 5% or less $O_2$ at a temperature of 1100° C. to 1250° C. for 1 to 24 hours. The examples of the results are shown in Table 1.

The description will now be directed to the aforementioned range of compositions effectively subjected to the heat treatment of the invention, with particular reference to Mn-Zn ferrites sintered at 1180° C.

When a Mn-Zn ferrite is sintered under more oxidizing conditions than in $N_2$ containing 0.8% $O_2$ at 1180° C. for 8 hours (e.g. sintered in an atmosphere containing more than 0.8% oxygen at 1180° C. for 8 hours or sintered in an atmosphere containing 0.8% $O_2$ at a temperature less than 1180° C.), the ferrite is so deteriorated in characteristics that it may not be of any practical use. Also, when the ferrite is sintered under more reducing conditions than in $N_2$ at 1180° C. for 8 hours (e.g. sintered in an atmosphere of $N_2$ containing trace of $H_2$ at 1180° C. for 8 hours or sintered in $N_2$ at a temperature exceeding 1180° C.), again the resulting characteristics of the ferrite appear to be too poor for practical use. For this reason, we limit the range of compositions for which the treatment at a temperature range not exceeding more than 400° C. but not less than 150° C. is effectively applicable to a region where the $F_2O_3$ content is less than that on the border line passing through the points $c$ and $c'$ in FIG. 14 which represents sintering conditions in $N_2$ containing 0.8% $O_2$. The composition range for which the treatment at the temperature is not more than 280° C. and not less than 150° C. is effectively applicable is in the region where the $Fe_2O_3$ content is larger than that on the border line passing through the points $a$ and $a'$ in FIG. 14 which represents the sintering in pure $N_2$. In the region where the $Fe_2O_3$ content is more than that on the border line passing through the points $a$ and $a'$ but less than that on the border line passing through the points $c$ and $c'$, the treatment at a temperature within the range of 400° C. to 150° C. is effective depending on the sintering conditions before the treatment. With this in view, the region of compositions for which the treatment at a temperature within the range of 280° to 150° C. can be effective is limited to the region where the $Fe_2O_3$ content is larger than that on the border line which passes through the points $c$ and $c'$.

EXAMPLE 6

The heat treatment of the invention was carried out for a large number of Mn-Zn ferrite sintered bodies having basic compositions in the range of 30 to 42 mol percent MnO, 0 to 18 mol percent ZnO and 52 to 59.4 mol percent $Fe_2O_3$ and containing as additives at least one of about 0.005 to 0.05 wt. percent $SiO_2$, about 0.02 to 0.5 wt. percent CaO, 0 to about 0.125 wt. percent $Li_2O$, 0 to about 3.2 wt. percent $SnO_2$ and 0 to about 0.5 wt. percent $Co_2O_3$. Typical results are shown in Table 2. It was found by this example that the effectiveness of the heat treatment of the invention is not adversely affected by the presence of these additives, although the border line between the Fe-deficient and Fe-excessive regions may be shifted in response to the amounts of the additives. It was also discovered that the Mn-Zn ferrites having a hysteresis loss less than 15 can be obtained with the basic composition lying within a broader region than the area B–F–G–D–E–H–I of FIG. 15, where they contain at least one of the above additives.

It will be obvious from the six examples of the present invention above described that the heat treatment of previously sintered specimens at suitable temperatures below 400° C. can markedly improve both the hysteresis loss and the time stability of initial permeability of Mn-Zn ferrite over a relatively broad range of compositions and that the present invention is extremely advantageous for the manufacture of oxide magnetic materials having excellent magnetic characteristics.

Although the present invention has been described in conjunction with preferred embodiments, it is to be understood that modifications and variations may be resorted to without departing from the spirit and scope of the invention as those skilled in the art readily understand. Such modifications and variations are considered to be within the purview and scope of the invention and the appended claims.

TABLE 1

Figure 15:
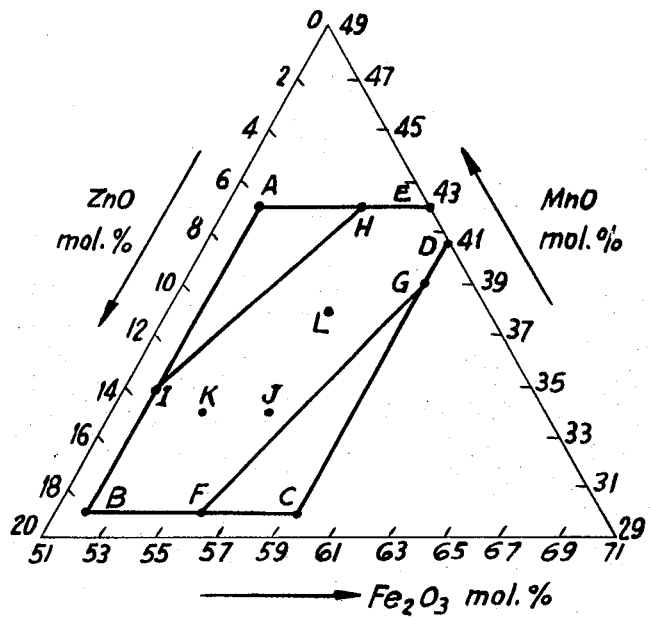

| Point in Fig. 15 | Basic composition (mol percent) | | | Sintering conditions | | | Conditions of the heat treatment | | Before the heat treatment | | After the heat treatment | |
|---|---|---|---|---|---|---|---|---|---|---|---|---|
| | MnO | ZnO | Fe₂O₃ | Temperature (°C.) | Time (hr.) | Atmosphere | Temperature (°C.) | Time (hr.) | $h_{10}$ | $(\Delta\mu/\mu^2)\times10^6$ 10″–100″ | $h_{10}$ | $(\Delta\mu/\mu^2)\times10^6$ 10″–100″ |
| A | 42 | 6 | 52 | 1,180 | 8 | N₂ | 350 | 4 | 55 | 29 | 40 | 16 |
|  |  |  |  | 1,170 | 10 | N₂ | 350 | 4 | 60 | 35 | 43 | 18 |
| B | 30 | 18 | 52 | 1,150 | 10 | N₂ | 350 | 4 | 20 | 3.5 | 14 | 3 |
|  |  |  |  | 1,180 | 8 | N₂ | 350 | 1.5 | 15 | 3 | 10 | 2 |
| C | 30 | 10.6 | 59.4 | 1,180 | 8 | N₂+0.8% O₂ | 160 | 100 | 20 | 20 | 15 | 11 |
|  |  |  |  | 1,250 | 1 | N₂+5% O₂ | 170 | 30 | 25 | 25 | 16 | 14 |
| D | 40.6 | 0 | 59.4 | 1,180 | 8 | N₂+0.5% O₂ | 200 | 8 | 18 | 24 | 13 | 17 |
|  |  |  |  | 1,250 | 3 | N₂+2.5% O₂ | 350 | 4 | 25 | 16 | 15 | 11 |
| E | 42 | 0 | 58 | 1,250 | 3 | N₂+2.5% O₂ | 300 | 4 | 70 | 25 | 60 | 16 |
|  |  |  |  | 1,180 | 8 | N₂+0.4% O₂ | 250 | 10 | 10 | 12 | 7 | 8 |
| F | 30 | 14 | 56 | 1,180 | 8 | N₂+0.4% O₂ | 160 | 100 | 23 | 20 | 15 | 14 |
|  |  |  |  | 1,250 | 3 | N₂+2.5% O₂ | 160 | 100 | 6 | 4 | 5 | 2.5 |
| G | 39 | 1.6 | 59.4 | 1,250 | 3 | N₂+2.5% O₂ | 275 | 4 | 10 | 10 | 6 | 7 |
|  |  |  |  | 1,180 | 8 | N₂+0.4% O₂ | 200 | 4 | 25 | 35 | 18 | 28 |
| H | 42 | 2.5 | 55.5 | 1,180 | 8 | N₂ | 250 | 4 | 11 | 15 | 8 | 10 |
|  |  |  |  | 1,100 | 24 | N₂ | 200 | 10 | 15 | 20 | 10 | 15 |
| I | 35 | 13 | 52 | 1,180 | 8 | N₂ | 350 | 4 | 32 | 8 | 14 | 4 |
|  |  |  |  | 1,200 | 4 | N₂ | 325 | 10 | 40 | 6 | 16 | 5 |
| J | 34 | 9.5 | 56.5 | 1,180 | 8 | N₂+0.5% O₂ | 200 | 4 | 10 | 6 | 6 | 3 |
|  |  |  |  | 1,250 | 3 | N₂+2.5% O₂ | 300 | 4 | 18 | 7 | 9 | 5 |
| K | 34 | 12 | 54 | 1,180 | 8 | N₂+0.3% O₂ | 350 | 4 | 17 | 5 | 7 | 3 |
|  |  |  |  | 1,180 | 8 | N₂+0.3% O₂ | 300 | 16 | 17 | 5 | 7 | 3 |
| L | 38 | 5.5 | 56.5 | 1,180 | 8 | N₂+0.4% O₂ | 200 | 4 | 4 | 8 | 3 | 3.5 |
|  |  |  |  | 1,200 | 4 | N₂+1.0% O₂ | 240 | 20 | 5 | 7.5 | 2.8 | 3.4 |

NOTE.—The plus sign "+" signifies "containing". The same applies to Table 2.

TABLE 2

| Basic composition (mol percent) | | | Additives (wt. percent) | | | | | | Sintering conditions | | | Conditions of the heat treatment | | Before the heat treatment | | After the heat treatment | |
|---|---|---|---|---|---|---|---|---|---|---|---|---|---|---|---|---|---|
| MnO | ZnO | Fe₂O₃ | SnO₂ | Li₂O | CaO | SiO₂ | Co₂O₃ | | Temperature (°C.) | Time (hr.) | Atmosphere | Temperature (°C.) | Time (hr.) | $h_{10}$ | $(\Delta\mu/\mu^2)\times10^6$ 10″–100″ | $h_{10}$ | $(\Delta\mu/\mu^2)\times10^6$ 10″–100″ |
| 30 | 18 | 52 | 1.0 |  |  |  |  |  | 1,180 | 8 | N₂ | 350 | 4 | 15 | 4 | 10 | 2 |
| 30 | 18 | 52 | 3.2 |  |  |  |  |  | 1,180 | 8 | N₂ | 350 | 4 | 12 | 5 | 7 | 3 |
| 30 | 18 | 52 | 3.2 | 0.125 |  |  |  |  | 1,180 | 8 | N₂ | 350 | 4 | 10 | 4 | 5 | 2.5 |
| 30 | 14 | 56 |  | 0.05 |  |  |  |  | 1,180 | 8 | N₂+0.4% O₂ | 160 | 100 | 19 | 15 | 10 | 11 |
| 30 | 14 | 56 |  | 0.125 |  |  |  |  | 1,180 | 8 | N₂+0.4% O₂ | 160 | 100 | 15 | 9 | 7 | 5 |
| 30 | 14 | 56 | 1.5 | 0.125 |  |  |  |  | 1,180 | 8 | N₂+0.4% O₂ | 150 | 100 | 8 | 6 | 5 | 3 |
| 35 | 13 | 52 | 3.2 | 0.125 |  |  |  |  | 1,200 | 4 | N₂ | 350 | 4 | 8 | 8 | 3 | 4 |
| 38 | 5.5 | 56.5 | 0.2 | 0.01 | 0.02 |  |  |  | 1,180 | 8 | N₂+0.4% O₂ | 240 | 20 | 5 | 7 | 3 | 4 |
| 38 | 5.5 | 56.5 | 0.5 | 0.02 | 0.5 | 0.05 |  |  | 1,180 | 8 | N₂+0.4% O₂ | 240 | 20 | 4 | 6 | 2 | 4 |
| 38 | 5.5 | 56.5 | 1.0 | 0.03 |  | 0.005 | 0.5 |  | 1,180 | 8 | N₂+0.4% O₂ | 240 | 20 | 4 | 6 | 2 | 4 |
| 38 | 5.5 | 56.5 |  |  |  | 0.2 |  |  | 1,200 | 4 | N₂+1.0% O₂ | 240 | 20 | 10 | 9 | 5 | 4.5 |
| 38 | 5.5 | 56.5 |  |  |  |  | 0.01 |  | 1,200 | 4 | N₂+1.0% O₂ | 240 | 20 | 7 | 9 | 4 | 5 |
| 38 | 5.5 | 56.5 |  |  |  | 0.2 | 0.01 |  | 1,200 | 4 | N₂+1.0.9% O₂ | 240 | 20 | 5 | 7.5 | 3 | 4 |
| 38 | 5.5 | 56.5 | 1.0 | 0.03 |  | 0.2 | 0.01 | 0.5 | 1,200 | 4 | N₂+1.0% O₂ | 240 | 20 | 4 | 8 | 2 | 5 |
| 39 | 1.6 | 59.4 |  | 0.1 |  |  |  |  | 1,180 | 8 | N₂+0.4% O₂ | 270 | 4 | 9 | 9 | 4 | 6 |

What is claimed is:
1. A method of improving the magnetic properties of a sintered manganese-zinc ferrite body comprised essentially of about 30 to 42 mol percent MnO, 0 to 18 mol percent ZnO and 52 to 59.4 mol percent Fe₂O₃, which consists essentially of the steps of providing a ferrite body previously sintered in a nitrogen atmosphere containing less than 5% O₂ at a temperature of about 1100° C. to 1250° C. for a time duration of about one hour to 24 hours and reheating said body at a temperature between about 150° C. and 400° C. for a time duration of about 1.5 to 100 hours such that where the Fe₂O₃ content of said ferrite body falls to the right of the line c-c' of FIG. 14, wherein point c represents the composition 30 mol percent MnO, 12 mol percent ZnO and 58 mol percent Fe₂O₃ and point c' represents the composition 34 mol percent MnO, 6.6 mol percent ZnO and 59.4 mol percent Fe₂O₃, the temperature is maintained between 150° C. and 280° C. and such that where the Fe₂O₃ content of said ferric body falls to the left of said line, the temperature ranges from about 150° C. to 400° C., whereby the hysteresis loss and the time stability of initial permeability of said ferrite body are both decreased.

2. The method as claimed in claim 1, in which the heating of said ferrite body is carried out for a time duration exceeding about 4 hours.

3. The method as claimed in claim 1, in which said ferrite body has a composition falling within the area A–B–C–D–E of FIG. 15, the compositions of the vertices of said area being as follows:

| | Mol percent | | |
|---|---|---|---|
| | MnO | ZnO | Fe₂O₃ |
| A | 42 | 6 | 52 |
| B | 30 | 18 | 52 |
| C | 30 | 10.6 | 59.4 |
| D | 40.6 | 0 | 59.4 |
| E | 42 | 0 | 58 |

4. The method as claimed in claim 3, in which said ferrite body further contains at least one additive selected from the group consisting of about 0.005 to 0.05 wt. percent SiO₂, about 0.02 to 0.5 wt. percent CaO, 0 to about 0.125 wt. percent Li₂O, 0 to about 3.2 wt. percent SnO₂ and 0 to about 0.5 wt. percent Co₂O₃.

5. The method as claimed in claim 1, in which said ferrite body has a composition falling within the area B–F–G–D–E–H–I of FIG. 15, the compositions of the vertices of said area being as follows:

| | Mol percent | | |
|---|---|---|---|
| | MnO | ZnO | Fe₂O₃ |
| B | 30 | 18 | 52 |
| F | 30 | 14 | 56 |
| G | 39 | 1.6 | 59.4 |
| D | 40.6 | 0 | 59.4 |
| E | 42 | 0 | 58 |
| H | 42 | 2.5 | 55.5 |
| I | 35 | 13 | 53 |

6. The method as claimed in claim 5, in which said ferrite body further contains at least one additive selected from the group consisting of about 0.005 to 0.05 wt. percent $SiO_2$, about 0.02 to 0.5 wt. percent CaO, 0 to about 0.125 wt. percent $Li_2O$, 0 to about 3.2 wt. percent $SnO_2$ and 0 to about 0.5 wt. percent $Co_2O_3$.

References Cited

UNITED STATES PATENTS

| | | | |
|---|---|---|---|
| 2,924,573 | 2/1960 | Sasaki et al. | 252—62.62 |
| 2,906,979 | 9/1959 | Bozorth et al. | 252—62.62 |
| 3,046,228 | 8/1962 | Beaudoin et al. | 252—62.62 |
| 3,242,089 | 3/1966 | Barton et al. | 252—62.62 |
| 3,533,949 | 10/1970 | Slick | 252—62.62 |
| 3,514,405 | 5/1970 | Rabl et al. | 252—62.62 |
| 3,565,806 | 2/1971 | Ross | 252—62.62 |
| 3,567,641 | 3/1971 | Ross et al. | 252—62.62 |

FOREIGN PATENTS

| | | | |
|---|---|---|---|
| 1,142,104 | 2/1969 | Great Britain | 252—62.62 |
| 1,471,428 | 3/1969 | Germany | 252—62.62 |
| 1,917,009 | 10/1970 | Germany | 252—62.62 |

OTHER REFERENCES

A. W. Vinal, "Sintering Process for Ferrite Cores," IBM Technical Disclosure Bulletin, vol. 6, No. 2, July 1963, at 17.

JULIUS FROME, Primary Examiner

J. H. MILLER, Assistant Examiner

U.S. Cl. X.R.

252—62.62; 264—65, 345, 346